US009430676B1

(12) United States Patent
Nickerson et al.

(10) Patent No.: US 9,430,676 B1
(45) Date of Patent: Aug. 30, 2016

(54) PROCESSOR RELATED NOISE ENCRYPTOR

(71) Applicant: LENOVO Enterprise Solutions (Singapore) PTE. LTD., New Tech Park (SG)

(72) Inventors: Matthew L. Nickerson, Raleigh, NC (US); Zachary B. Durham, Durham, NC (US); William M. Megarity, Raleigh, NC (US); Brian C. Totten, Durham, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 51 days.

(21) Appl. No.: 14/660,534

(22) Filed: Mar. 17, 2015

(51) Int. Cl.
*G06F 21/75* (2013.01)
*H04L 9/00* (2006.01)

(52) U.S. Cl.
CPC ............. *G06F 21/75* (2013.01); *H04L 9/002* (2013.01)

(58) Field of Classification Search
CPC ...................................................... H04L 9/002
See application file for complete search history.

(56) References Cited

U.S. PATENT DOCUMENTS

| 7,333,611 B1* | 2/2008 | Yuen ...................... H04B 10/70 380/256 |
| 7,668,310 B2 | 2/2010 | Kocher et al. |
| 8,457,302 B1 | 6/2013 | Vater et al. |
| 2004/0064711 A1* | 4/2004 | Fernando ............... G06Q 20/20 713/189 |
| 2006/0222181 A1* | 10/2006 | Wu .......................... H04L 9/00 380/268 |
| 2007/0177738 A1* | 8/2007 | Diorio .................. G06K 7/0008 380/270 |
| 2010/0095133 A1 | 4/2010 | Peter et al. |
| 2011/0191842 A1* | 8/2011 | Lindholm ............. H04L 9/3271 726/9 |

(Continued)

FOREIGN PATENT DOCUMENTS

WO 9962189 A2 12/1999

OTHER PUBLICATIONS

Kuhn et al., Soft Tempest: Hidden Data Transmission Using Electromagnetic Emanations, Information Hiding 1998, LNCS 1525, pp. 124-142, Springer-Verlag Berlin Heidelberg 1998.

(Continued)

*Primary Examiner* — Hadi Armouche
*Assistant Examiner* — Ali Shayanfar
(74) *Attorney, Agent, or Firm* — Kunzler Law Group; Katherine S. Brown

(57) ABSTRACT

An apparatus for encrypting processor related noise is disclosed. A method and a computer program product also perform the functions of the apparatus. The apparatus includes a frequency selection module that selects frequencies for a first noise output. The frequencies are within a range of frequencies of a second noise output. The second noise output is produced by one or more first voltage regulating modules providing power to a processor. The apparatus includes an amplitude selection module that selects an amplitude for each frequency of the first noise output. The apparatus includes a noise scrambling module that produces the first noise output based on one or both of the frequency selection module and the amplitude selection module. The first noise output combines with the second noise output to produce a third noise output such that coherence between the third noise output and operations of the processor is below a threshold.

19 Claims, 7 Drawing Sheets

(56) References Cited

U.S. PATENT DOCUMENTS

| | | |
|---|---|---|
| 2011/0228926 A1 | 9/2011 | Shumow et al. |
| 2012/0297110 A1 | 11/2012 | Kavi |
| 2013/0064362 A1 | 3/2013 | Tang et al. |
| 2013/0298181 A1* | 11/2013 | Smith ................. H04L 61/2539 726/1 |
| 2014/0157412 A1 | 6/2014 | Chen et al. |
| 2016/0055485 A1* | 2/2016 | Benoit ................. G06Q 20/401 705/71 |

OTHER PUBLICATIONS

Sebastian Anthony, Researchers crack the world's toughest encryption by listening to the tiny sounds made by your computer's CPU, http://www.extremetech.com/extreme/173108-researchers-crack-the-worlds-toughest-encryption-by-listening-to-the-tiny-sounds-made-by-your-computers-cpu, Dec. 18, 2013.

* cited by examiner

PROCESSOR RELATED NOISE ENCRYPTOR

BACKGROUND

1. Field

The subject matter disclosed herein relates to processor related noise and more particularly relates to encrypting processor related noise.

2. Description of the Related Art

Information handling devices, such as desktop computers, laptop computers, tablet computers, smart phones, optical head-mounted display units, smart watches, etc., are ubiquitous in society. An information handling device generally includes a processor. Operating the processor may produce noise, such as high-pitched sounds between 10 to 150 KHz. In certain configurations, the noise may result from one or more voltage regulators used to power the processor. The noise may correspond to operations of the processor.

BRIEF SUMMARY

An apparatus for encrypting processor related noise is disclosed. A method and a computer program product also perform the functions of the apparatus. The apparatus includes a frequency selection module that selects frequencies for a first noise output. The frequencies are within a range of frequencies of a second noise output. The second noise output is produced by one or more first voltage regulating modules providing power to a processor. The apparatus includes an amplitude selection module that selects an amplitude for each frequency of the first noise output. The apparatus includes a noise scrambling module that produces the first noise output based on one or both of the frequency selection module and the amplitude selection module. The first noise output combines with the second noise output to produce a third noise output such that a coherence between the third noise output and operations of the processor is below a threshold.

In one embodiment, the apparatus includes a coherence determination module that compares the third noise output to the operations of the processor to determine the coherence. The apparatus, in another embodiment, includes a processor monitoring module that monitors the operations of the processor and provides data corresponding to the operations of the processor to the coherence determination module. In some embodiments, the apparatus includes a noise detection module that detects the third noise output and provides the third noise output to the coherence determination module. In such embodiments, the noise detection module may include a transducer that detects the third noise output.

In one embodiment, the frequency selection module of the apparatus selects the frequencies for the first noise output based at least partly on the coherence, and the amplitude selection module of the apparatus selects the amplitude for each of the first noise output based at least partly on the coherence. In another embodiment, the noise scrambling module of the apparatus includes one or more second voltage regulating modules and one or more loads coupled to the one or more second voltage regulating modules. In such an embodiment, the one or more second voltage regulating modules produce the first noise output. In some embodiments, the one or more loads of the noise scrambling module are varied to change the first noise output.

In one embodiment, the one or more loads of the noise scrambling module are varied by one or both of the frequency selection module selecting the frequencies for the first noise output and the amplitude selection module selecting the amplitude for each frequency of the first noise output. In another embodiment, the one or more loads of the noise scrambling module are varied based on the coherence between the third noise output and the operations of the processor. In some embodiment, the one or more loads of the noise scrambling module are varied to produce a greater amount of the first noise output in response to the coherence being above the threshold than in response to the coherence being below the threshold. In one embodiment, the one or more loads of the noise scrambling module are varied to increase the first noise output in response to the coherence being above the threshold. In another embodiment, the one or more loads of the noise scrambling module include one or more transistors.

A method for encrypting processor related noise includes selecting frequencies for a first noise output. The frequencies are within a range of frequencies of a second noise output. The second noise output is produced by one or more first voltage regulating modules providing power to a processor. The method includes selecting an amplitude for each frequency of the first noise output. The method includes producing the first noise output based on one or both of the frequencies and the amplitude for each frequency. The first noise output combines with the second noise output to produce a third noise output such that a coherence between the third noise output and operations of the processor is below a threshold.

In one embodiment, the method includes comparing the third noise output to the operations of the processor to determine the coherence. In another embodiment, the method includes producing a greater amount of the first noise output in response to the coherence being above the threshold than in response to the coherence being below the threshold. In some embodiments of the method, producing the first noise output based on one or both of the frequencies and the amplitude for each frequency includes powering one or more transistors based on one or both of the frequencies and the amplitude for each frequency.

A system for encrypting processor related noise includes a processor, one or more first voltage regulating modules that provide power to the processor, and one or more second voltage regulating modules that provide scrambling noise. The system includes a frequency selection module that selects frequencies for a first noise output. The frequencies are within a range of frequencies of a second noise output. The second noise output is produced by the one or more first voltage regulating modules. The system includes an amplitude selection module that selects an amplitude for each frequency of the first noise output. The system includes a noise scrambling module that produces the first noise output based on one or both of the frequency selection module and the amplitude selection module. The first noise output combines with the second noise output to produce a third noise output such that a coherence between the third noise output and operations of the processor is below a threshold.

In one embodiment, the system includes a printed circuit board (PCB) including the processor, the one or more first voltage regulating modules, the one or more second voltage regulating modules, the frequency selection module, the amplitude selection module, and the noise scrambling module. In another embodiment, the system includes an information handling device that includes the processor, the one or more first voltage regulating modules, the one or more second voltage regulating modules, the frequency selection module, the amplitude selection module, and the noise scrambling module.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
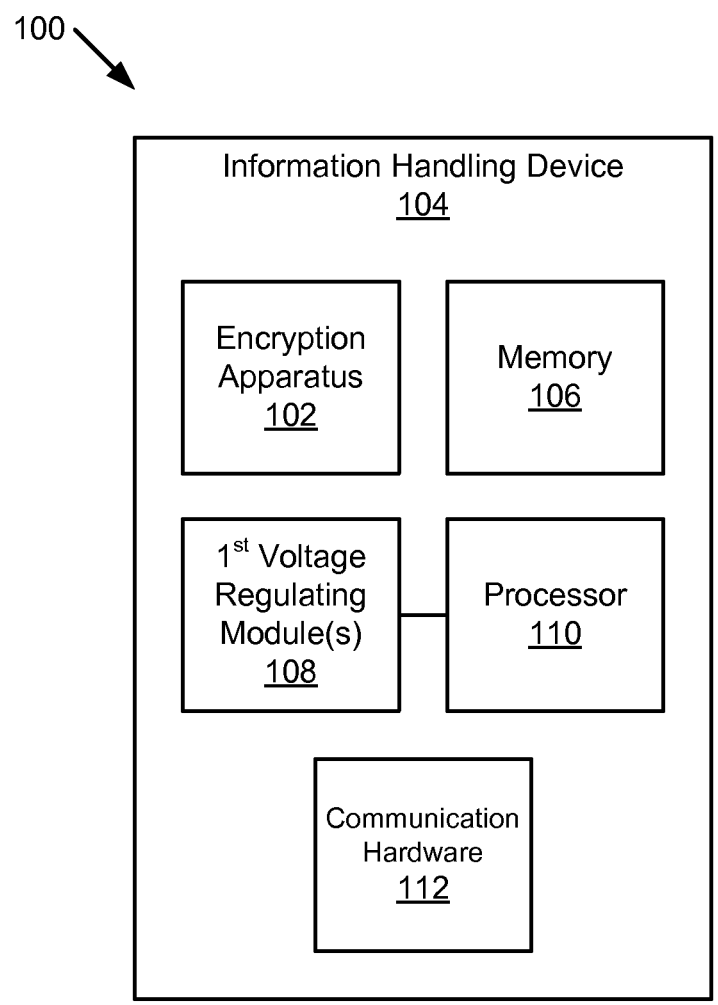
FIG. 1 is a schematic block diagram illustrating one embodiment of a system for encrypting processor related noise in accordance with one embodiment of the present invention.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a system 100 for encrypting processor related noise in accordance with one embodiment of the present invention. The system 100 includes an encryption apparatus 102 in an information handling device 104, wherein the information handling device 104 includes memory 106, one or more first voltage regulating modules 108, a processor 110, and communication hardware 112, which are described below. As may be appreciated, in some embodiments, one or more of the encryption apparatus 102, the memory 106, the one or more first voltage regulating modules 108, the processor 110, and the communication hardware 112 may be included on a printed circuit board (PCB). Furthermore, in some embodiments, all of the encryption apparatus 102, the one or more first voltage regulating modules 108, and the processor 110 may be included on the PCB.

In general, the encryption apparatus 102 provides a way to encrypt a second noise produced by the one or more first voltage regulating modules 108. The one or more first voltage regulating modules 108 provide power to the processor 110. The second noise produced by the one or more first voltage regulating modules 108 may result from operations of the processor 110. For example, the operations of the processor 110 may vary the load placed on the one or more first voltage regulating modules 108 resulting in the one or more first voltage regulating modules 108 vibrating to produce the second noise.

The encryption apparatus 102 selects frequencies for a first noise output that are within a range of frequencies of the second noise output. The encryption apparatus 102 selects an amplitude for each frequency of the first noise output. Moreover, the encryption apparatus 102 produces the first noise output based on one or both of the frequencies and the amplitude for each frequency. The first noise output combines with the second noise output to produce a third noise output. The encryption apparatus 102 produces the first noise output to result in a coherence between the third noise output and operations of the processor 110 being below a threshold. The encryption apparatus 102 is described in more detail with regard to the system 200, and the apparatuses 300, 400 of FIGS. 2, 3, and 4.

The encryption apparatus 102 is depicted in the information handling device 104, but may be located in various components and memory of the information handling device 104. For example, the encryption apparatus 102 may include transducers, transistors, voltage regulators, digital signal processors, and other hardware. In another example, the encryption apparatus 102 is implemented in software and all or a portion may be stored in the memory 106 on the information handling device 104. In another embodiment, the encryption apparatus 102 is implements in software and hardware. One of skill in the art will recognize other implementations of the encryption apparatus 102 using hardware, software, or both.

The information handling device 104 may include any device that generates noise relating to operations of the processor 110. For example, in one embodiment, the information handling device 104 includes a computing device, such as a desktop computer, a laptop computer, a personal digital assistant (PDA), a tablet computer, a smart phone, a smart television (e.g., televisions connected to the Internet), a set-top box, a game console, a security system (including security cameras), a vehicle on-board computer, or the like. In some embodiments, the information handling device 104 includes a wearable device, such as a smart watch, a fitness band, an optical head-mounted display, or the like.

The memory 106, in one embodiment, is a computer readable storage medium. In some embodiments, the memory 106 includes volatile computer storage media. For example, the memory 106 may include a random access memory (RAM), including dynamic RAM (DRAM), synchronous dynamic RAM (SDRAM), and/or static RAM (SRAM). In some embodiments, the memory 106 includes non-volatile computer storage media. For example, the memory 106 may include a hard disk drive, a flash memory, or any other suitable non-volatile computer storage device. In some embodiments, the memory 106 includes both volatile and non-volatile computer storage media.

In certain embodiments, the memory 106 stores data relating to operation of the encryption apparatus 102. Moreover, in some embodiments, the memory 106 also stores program code and related data, such as an operating system or other controller algorithms operating on the information handling device 104.

The one or more first voltage regulating modules 108 may include one or more voltage regulators that provide power to the processor 110. The one or more voltage regulators may facilitate maintaining constant voltage levels used by the processor 110. During operation, the one or more first voltage regulating modules 108 may produce a second noise output, such as high-pitched sounds between 10 to 150 KHz. The second noise output produced by the one or more first voltage regulating modules 108 may correspond directly with operations of the processor 110. For example, the one or more first voltage regulating modules 108 may vibrate to produce sounds that correspond directly with a number of or frequency of operations of the processor 110. The encryption apparatus 102 may be used to produce a first noise output that combines with the second noise output to produce a third noise output such that a coherence between the third noise output and operations of the processor 110 is below a threshold (e.g., such that the third noise output does not correspond directly with operations of the processor 110). As may be appreciated, in certain embodiments, the threshold may be a predetermined threshold such as 10 percent, 20 percent, 40 percent, 50 percent, 80 percent, and so forth.

The processor 110, in one embodiment, may include any known controller capable of executing computer-readable instructions and/or capable of performing logical operations. For example, the processor 110 may be a microcontroller, a microprocessor, a central processing unit (CPU), a graphics processing unit (GPU), an auxiliary processing unit, a field programmable gate array (FPGA), or similar programmable controller. In some embodiments, the processor 110 executes instructions stored in the memory 106 to perform the methods and routines described herein. The processor 110 is communicatively coupled to the memory 106, the one or more first voltage regulating modules 108, and the communication hardware 112. The communication hardware 112 may facilitate communication with other devices. For example, the communication hardware 112 may enable communication via Bluetooth®, WiFi™, and so forth.

Figure 2:
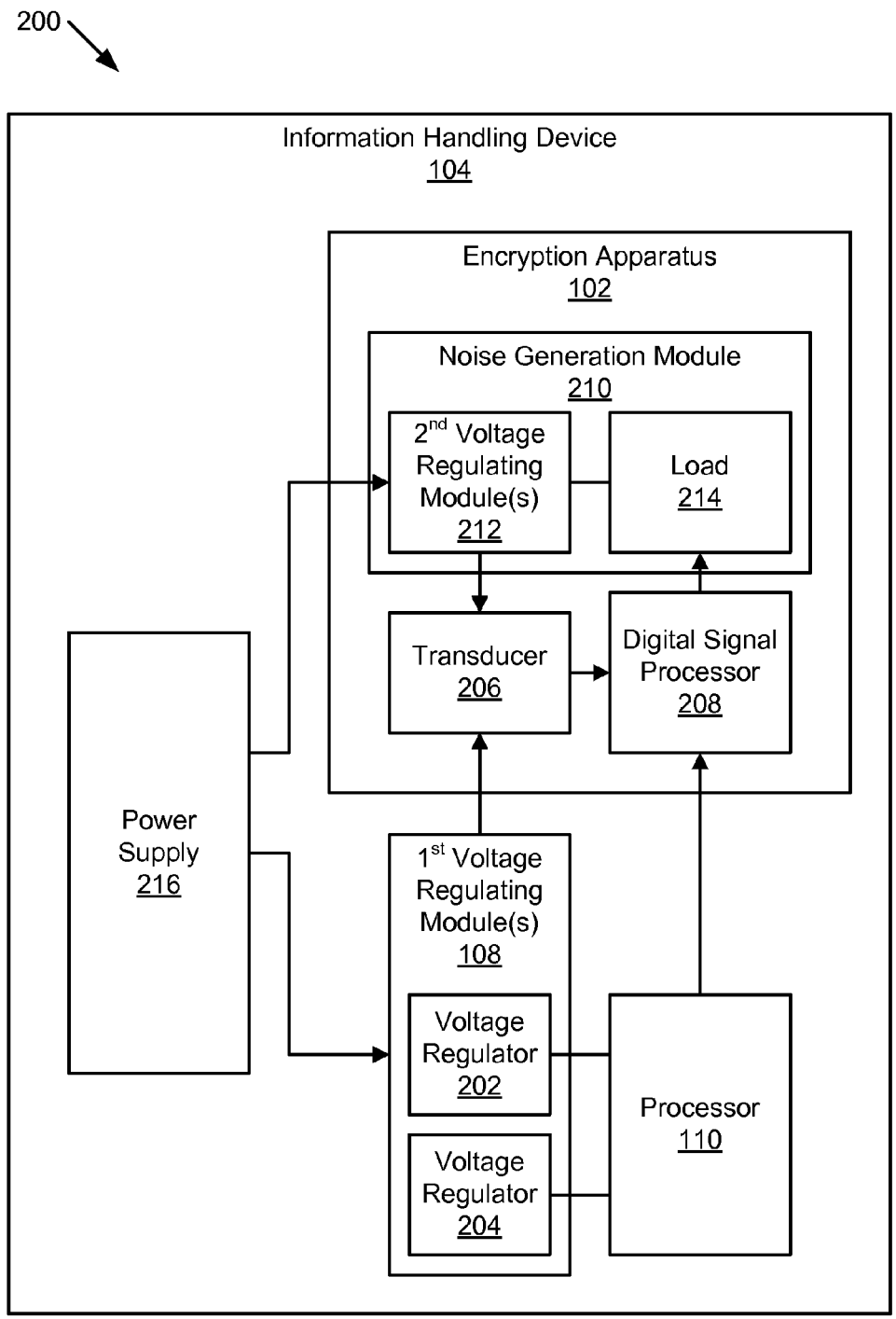
FIG. 2 is a schematic block diagram illustrating another embodiment of a system for encrypting processor related noise in accordance with one embodiment of the present invention.

FIG. 2 is a schematic block diagram illustrating another embodiment of a system 200 for encrypting processor related noise in accordance with one embodiment of the present invention. The system 200 includes one embodiment of the information handling device 104 having the encryption apparatus 102, the one or more first voltage regulating modules 108, and the processor 110, which are substantially similar to those described above in relation to the system 100 of FIG. 1. Moreover, the one or more first voltage regulating modules 108 include voltage regulators 202 and 204, which are described below. The encryption apparatus 102 includes a transducer 206, a digital signal processor 208, and a noise generation module 210, which are also described below. Furthermore, the noise generation module 210 includes one or more second voltage regulating modules 212 and a load 214, which are described below. A power supply 216 provides power to the one or more first voltage regulating modules 108 and to the one or more second voltage regulating modules 212.

The one or more first voltage regulating modules 108 include the voltage regulators 202 and 204. While two voltage regulators 202 and 204 are illustrated, the one or more first voltage regulating modules 108 may include fewer or more voltage regulators. The voltage regulators 202 and 204 receive power from the power supply 216 and provide regulated voltages to the processor 110 to facilitate operations of the processor 110. In certain embodiments, the one or more first voltage regulating modules 108 may provide regulated voltages to the processor 110 using a device other than the voltage regulators. The one or more first voltage regulating modules 108 produce a second noise output during operation. The second noise output changes based on the operations performed by the processor 110.

The transducer 206 may be any type of suitable sound sensor. For example, the transducer 206 may be a microphone. During operation, the transducer 206 detects the second noise output and provides data corresponding to the detected second noise output to the digital signal processor 208. The digital signal processor 208 receives the detected second noise output and data from the processor 110 corresponding to operations of the processor 110. Moreover, the digital signal processor 208 compares the second noise output to the data corresponding to the operations of the processor 110 to determine a coherence. If the coherence is above a predetermined threshold, the digital signal processor 208 provides an output to drive the noise generation module 210. However, if the coherence is below the predetermined threshold, the digital signal processor 208 does not provide an output to drive the noise generation module 210. While a digital signal processor 208 is included in the illustrated embodiment, other embodiments may use another device capable of receiving inputs, determining an output based on the inputs, and driving output circuitry based on the determined output, as described herein.

The output to drive the noise generation module 210 may be determined by the digital signal processor 208 selecting frequencies for a first noise output to be produced by the noise generation module 210 and/or by the digital signal processor 208 selecting an amplitude for each frequency for the first noise output. The digital signal processor 208 produces the output to drive the noise generation module 210 based on the frequencies and/or the amplitude for each frequency.

The noise generation module 210 may include any suitable electronic device capable of producing the first noise output. In one embodiment, the noise generation module 210 includes one or more transistors used as the load 214 for the one or more second voltage regulating modules 212. The one or more second voltage regulating modules 212 produce the first noise output in response to changes in the load 214 resulting from changes to power applied to the one or more transistors. The power supply 216 provides power to the one or more second voltage regulating modules 212, as well as other devices (not shown). In another embodiment, the noise generation module 210 includes one or more transistors used as the load 214 for the one or more first voltage regulating modules 108. In such an embodiment, the first noise output is produced by the one or more first voltage regulating modules 108 in conjunction with the second noise output. Moreover, in yet another embodiment, the noise generation module 210 includes a transducer used to produce the first noise output instead of the one or more second voltage regulating modules 212 and the load 214.

While being driven by the output from the digital signal processor 208, the noise generation module 210 produces the first noise output. The transducer 206 senses the third noise output, which is a combination of the first noise output and the second noise output. As may be appreciated, first sound waves from the first noise output meet with second sound waves from the second noise output resulting in third sound waves of the third noise output. The third sound waves result from constructive and/or destructive interference as the first and second sound waves meet. The transducer 206 provides data corresponding to the detected third noise output to the digital signal processor 208. The digital signal processor 208 receives the detected third noise output from the transducer 206 and data from the processor 110 corresponding to operations of the processor 110. Moreover, the digital signal processor 208 compares the third noise output to the data corresponding to the operations of the processor 110 to determine an updated coherence. If the updated coherence is above a predetermined threshold, the digital signal processor 208 provides a different output to drive the noise generation module 210 than previously provided. For example, the digital signal processor 208 may provide an output that increases or changes a frequency of the first noise output and/or increases an amplitude of the first noise output.

Moreover, if the coherence is below the predetermined threshold, the digital signal processor 208 may also provide a different output to drive the noise generation module 210 than previously provided, or the digital signal processor 208 may maintain the output already being provided. For example, the digital signal processor 208 may provide an output that decreases or changes the frequency of the first noise output and/or decreases or changes an amplitude of the first noise output. Such a cycle may continuously repeat for as long as desired for the encryption apparatus 102 to encrypt the second noise output produced as a result of the processor 110. In certain embodiments, the noise generation module 210 may be hysteresis controlled to be either on or off. In such embodiments, the noise generation module 210 may turn on production of the first noise output if the coherence is above the predetermined threshold, and may turn off production of the first noise output if the coherence is below the predetermined threshold. Moreover, the noise generation module 210 may turn on production of the first noise output at fixed frequencies and amplitudes that do not change based on the proximity of the coherence to the predetermined threshold.

Figure 3:
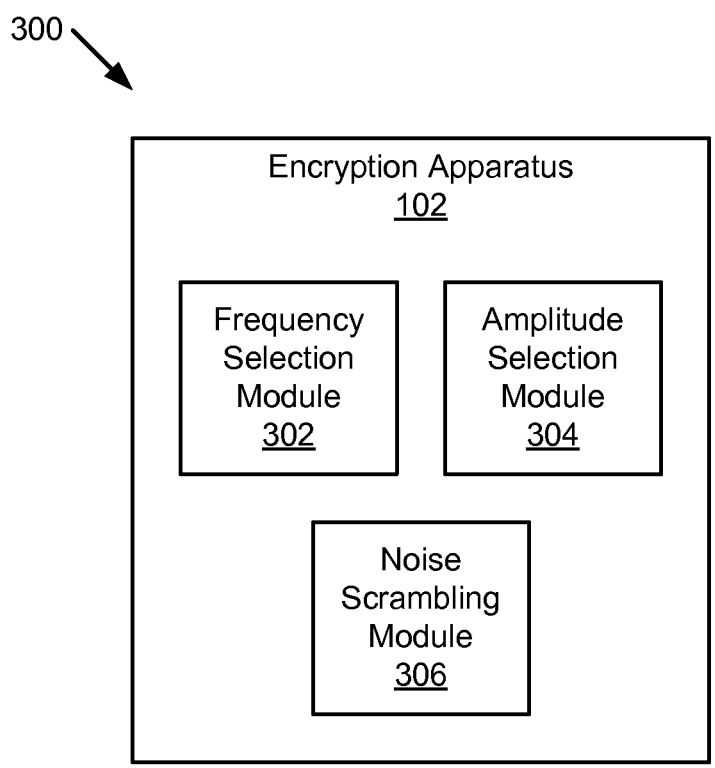
FIG. 3 is a schematic block diagram illustrating one embodiment of an apparatus for encrypting processor related noise in accordance with one embodiment of the present invention.

FIG. 3 is a schematic block diagram illustrating one embodiment of an apparatus 300 for encrypting processor related noise in accordance with one embodiment of the present invention. The apparatus 300 includes one embodiment of the encryption apparatus 102 with a frequency selection module 302, an amplitude selection module 304, and a noise scrambling module 306, which are described below.

In one embodiment, the apparatus 300 includes the frequency selection module 302 that selects frequencies for a first noise output. In certain embodiments, the frequencies are within a range of frequencies of a second noise output. In such an embodiment, the second noise output may be produced by the one or more first voltage regulating modules 108 that provide power to the processor 110. In some embodiments, the frequency selection module 302 may select the frequencies for the first noise output based at least partly on a coherence between a third noise output and operations of the processor 110. The third noise output is a combination of the first noise output and the second noise output. In certain embodiments, the frequency selection module 302 may select the frequencies dynamically after detecting a range a frequencies of the third noise output. In other embodiments, the frequency selection module 302 may select the frequencies using hardware and/or software and based on predetermined frequencies. For example, the frequency selection module 302 may include hardware designed to output driving signals to the noise scrambling module 306 at a single frequency set by the hardware. As another example, the frequency selection module 302 may include software designed to output driving signals to the noise scrambling module 306 at a hard coded frequency. In one embodiment, the frequency selection module 302 may select the frequencies for the first noise output to generate white noise within a range of frequencies similar to the second noise output.

In one embodiment, the apparatus 300 includes the amplitude selection module 304 that selects an amplitude for each frequency of the first noise output. In some embodiments, the amplitude selection module 304 may select the amplitude for each frequency for the first noise output based at least partly on the coherence between the third noise output and the operations of the processor 110. In certain embodiments, the amplitude selection module 304 may select the amplitude dynamically after detecting an amplitude of the third noise output. In other embodiments, the amplitude selection module 304 may select the amplitudes using hardware and/or software and based on predetermined amplitudes. For example, the amplitude selection module 304 may include hardware designed to output driving signals to the noise scrambling module 306 at a single amplitude set by the hardware. As another example, the amplitude selection module 304 may include software designed to output driving signals to the noise scrambling module 306 at a hard coded amplitude. In one embodiment, the amplitude selection module 304 may select that all amplitudes are the same, while in another embodiment the amplitude selection module 304 may select a different amplitude for different frequencies. For example, the amplitude selection module 304 may select amplitudes for certain frequencies to match or interfere with certain frequencies of the second noise output to decrease coherence.

In one embodiment, the frequency selection module 302 selects frequencies different than frequencies of the second noise output and/or the amplitude selection module 304 selects amplitudes of the frequencies to fill in between frequencies of the second noise output so that the combined third noise output has a coherence lower than a threshold or lower than the second noise output. In another embodiment, the frequency selection module 302 selects frequencies similar to those of the second noise output but out of phase and the amplitude selection module 304 selects amplitudes for certain frequencies of the second noise output to cancel or attenuate frequencies of the second noise output. One of skill in the art will recognize other ways to select frequencies and amplitudes to reduce coherence between the third noise output and the operations of the processor 110.

In some embodiments, the apparatus 300 includes the noise scrambling module 306 that produces the first noise output based on one or both of the frequency selection module 302 and the amplitude selection module 304. The first noise output combines with the second noise output to produce a third noise output such that the coherence between the third noise output and operations of the processor 110 is below a threshold. In some embodiments, the noise scrambling module 306 may produce the first noise output as white noise at preselected frequencies and/or amplitudes to reduce the coherence between the third noise output and the operations of the processor 110. Furthermore, in one embodiment, the noise scrambling module 306 may produce the first noise output in proportion to a difference between the coherence and the threshold such that in response to a large difference, the frequency and/or the amplitude are adjusted more than while the difference is small.

In one embodiment, the noise scrambling module 306 may be used to optimize noise uniformity in the third noise output, while in other embodiments, the noise scrambling module 306 may be used to cancel out the second noise output. Optimizing noise uniformity may mean that the noise scrambling module 306 generates random noise that changes based on operations of the processor 110 to mask the operations of the processor 110. In some embodiments, the noise scrambling module 306 produces the second noise output at frequencies and/or amplitudes that are outside the range of human hearing.

The noise scrambling module 306 may include any suitable electronic device capable of producing the first noise output. For example, in one embodiment, the noise scrambling module 306 may include one or more transistors used as the load 214 for the one or more second voltage regulating modules 212. In other embodiments, the load 214 may include resistors or other components that draw power and create a variable load. The one or more second voltage regulating modules 212 produce the first noise output in response to changes in the load 214 resulting from changes to power applied to the one or more transistors. Moreover, in another embodiment, the noise scrambling module 306 includes a transducer used to produce the first noise output.

Figure 4:
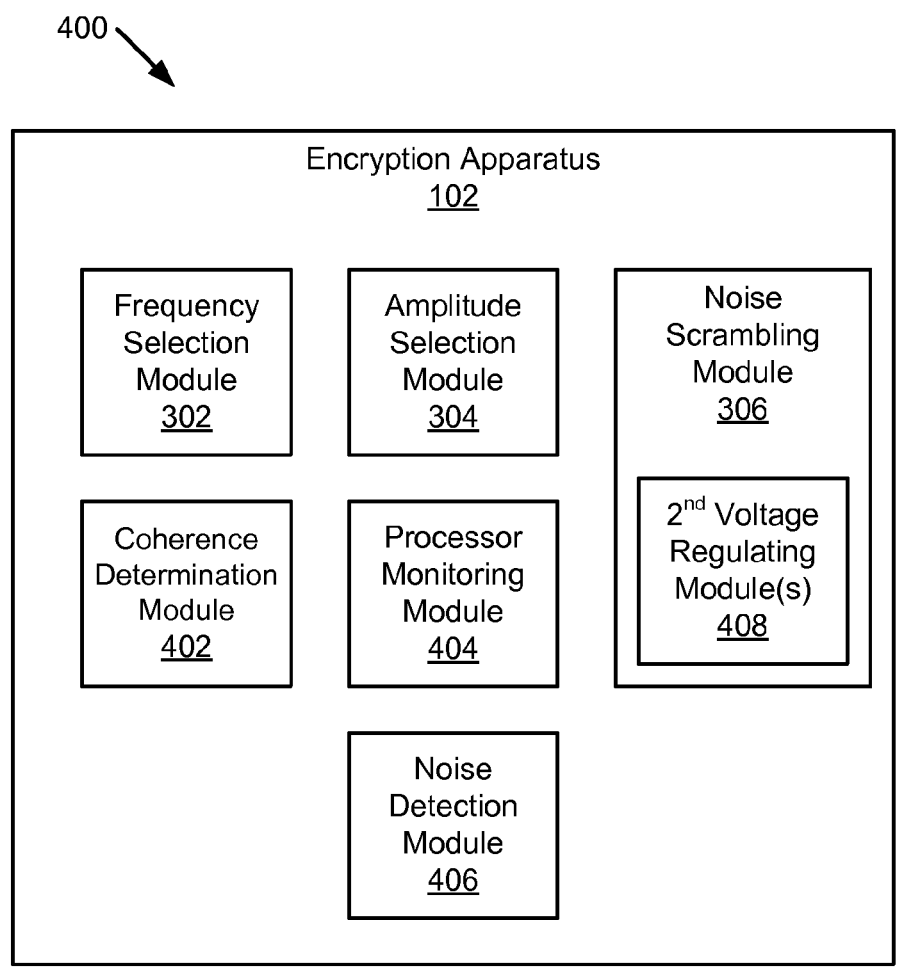
FIG. 4 is a schematic block diagram illustrating another embodiment of an apparatus for encrypting processor related noise in accordance with one embodiment of the present invention.

FIG. 4 is a schematic block diagram illustrating another embodiment of an apparatus 400 for encrypting processor related noise in accordance with one embodiment of the present invention. The apparatus 400 includes one embodiment of the encryption apparatus 102 with the frequency selection module 302, the amplitude selection module 304, and the noise scrambling module 306, which are substantially similar to those described above in relation to the apparatus 300 of FIG. 3. In various embodiments, the apparatus 400 may include a coherence determination module 402, a processor monitoring module 404, a noise detection module 406, and one or more second voltage regulating modules 408, which are described below. In one embodiment, the second voltage regulating modules 408 of the apparatus 400 of FIG. 4 are substantially similar to the second voltage regulating module 212 of the system 200 of FIG. 2.

In one embodiment, the apparatus 400 includes the coherence determination module 402 that compares the third noise output to the operations of the processor 110 to determine the coherence. For example, the coherence determination module 402 may receive the third noise output from the noise detection module 406 and may receive data corresponding to the operations of the processor 110 from the processor monitoring module 404. Moreover, in some embodiments, the coherence determined by the coherence determination module 402 may quantify how closely the third noise output matches with the data corresponding to the operations of the processor 110. For example, the third noise output may match the data corresponding to the operations of the processor 110 by 10 percent, 20 percent, 40 percent, 50 percent, 80 percent, 90 percent, and so forth and therefore have a coherence of such. In certain embodiments, the coherence may be quantified as a percentage of time that the third noise output corresponds with the data corresponding to the operations of the processor 110. For example, the coherence may be 10 percent, 20 percent, 40 percent, 50 percent, 80 percent, 90 percent, and so forth.

In certain embodiments, the coherence may be calculated using the following formula:

$$C_{xy}(f) = \frac{|G_{xy}(f)|^2}{G_{xx}(f)G_{yy}(f)}$$

To use this formula, x(t) and y(t) are two signals used. For example, x(t) may represent the third noise output and y(t) may represent the data corresponding to the operations of the processor 110. $G_{xy}(f)$ is the cross-spectral density between x and y, and $G_{xx}(f)$ and $G_{xy}(f)$ are the autospectral density of x and y respectively.

In some embodiments, a high coherence may be used to correlate the third noise output with specific operations of the processor 110, such as operations involving user authentication, data encryption, use of encryption keys, and the like. In such embodiments, passwords, encryption algorithms, encryption keys, and the like may be obtained by monitoring the third noise output or the second noise output if the encryption apparatus 102 is not present or functioning. However, reducing the coherence between the third noise output and the specific operations of the processor 110 also reduces the likelihood that passwords, encryption algorithms, encryption keys, and the like may be obtained by monitoring the third noise output. As such, a low coherence may show little correlation between the third noise output and specific operations of the processor 110.

The apparatus 400, in another embodiment, includes the processor monitoring module 404 that monitors the operations of the processor 110 and provides data corresponding to the operations of the processor 110 to the coherence determination module 402. For example, the processor monitoring module 404 may monitor a rate that operations of the processor 110 are performed, a frequency of operations of the processor 110, a number of operations of the processor 110 per time stamp, a number of operations per a predetermined time period, a periodicity of operations of the processor 110, and so forth. The data corresponding to the operations of the processor 110 may be provided to the coherence determination module 402 in real-time, or with a delay.

In some embodiments, the processor monitoring module 404 may monitor commands and/or data communicated with the processor 110. Furthermore, in one embodiment, the processor monitoring module 404 may monitor types of operations performed by the processor 110. The processor monitoring module 404 may monitor any operation of the processor 110 with sensitive information that may correlate to the second noise output with a high coherence where monitoring the second noise output could reveal the sensitive information. The encryption apparatus 102 reduces the coherence between the processor operations with the sensitive information and the second noise output by producing a first noise output that combines with the second noise output to reduce coherence so that discovering the sensitive information is more difficult or is not possible.

In one embodiment, the apparatus 400 includes the noise detection module 406 that detects the third noise output and provides the third noise output to the coherence determination module 402. In some embodiments, the noise detection module 406 includes the transducer 206 that detects the third noise output. The transducer 206 may be any suitable sound sensor, such as a microphone. As may be appreciated, the noise detection module 406 may be positioned adjacent to the one or more first voltage regulating modules 108 that provide power to the processor 110. Specifically, the noise detection module 406 may be positioned adjacent to the voltage regulators 202 and 204, which may more accurately detect the second noise output. Furthermore, the noise detection module 406 may be positioned adjacent to the one or more second voltage regulating modules 408. In some embodiments, the one or more first voltage regulating modules 108 may be positioned adjacent to the one or more second voltage regulating modules 408. Placing the one or more second voltage regulating modules 408 adjacent to the one or more first voltage regulating modules 108 may aid in combining the first and second noise outputs. Accordingly, the noise detection module 406 may receive noise produced by the one or more first voltage regulating modules 108 that provide power to the processor 110 and noise produced by the one or more second voltage regulating modules 408.

In certain embodiments, the noise detection module 406 may compute a noise produced by the one or more first voltage regulating modules 108 and/or the one or more second voltage regulating modules 408. The computation may be performed using operational specifications corresponding to the one or more first voltage regulating modules 108 and/or the one or more second voltage regulating modules 408. Furthermore, the computation may use data corresponding to the operations of the processor 110 for computing the noise produced by the one or more first voltage regulating modules 108. In addition, the computation may use data corresponding to driving the one or more second voltage regulating modules 408 for computing the noise produced by the one or more second voltage regulating modules 408.

The apparatus 400, in another embodiment, includes the one or more second voltage regulating modules 408 as part of the noise scrambling module 306. In some embodiments, the noise scrambling module 306 also includes one or more loads 214 coupled to the one or more second voltage regulating modules 408. In such embodiments, the one or more second voltage regulating modules 408 produce the first noise output. In some embodiments, the one or more loads 214 are varied to change the first noise output.

In certain embodiments, the one or more loads 214 may be varied by the frequency selection module 302 selecting the frequencies for the first noise output, and by the amplitude selection module 304 selecting the amplitude for each frequency of the first noise output. In such embodiments, voltages and/or currents provided to the one or more loads 214 may be selected based on the selected frequencies and/or amplitudes. Moreover, in some embodiments, the one or more loads 214 may be varied based on the coherence between the third noise output and the operations of the processor 110.

In some embodiments, the one or more loads 214 may be varied to produce a greater amount of the first noise output in response to the coherence being above the threshold than in response to the coherence being below the threshold. In one embodiment, the one or more loads 214 are varied to increase the first noise output in response to the coherence being above the threshold. In another embodiment, the one or more loads 214 include one or more transistors. In such an embodiment, the one or more transistors may be electrically coupled to the one or more second voltage regulating modules 212. The current draw of the one or more transistors may be increased to increase the load placed on the one or more second voltage regulating modules 212 and/or the current draw of the one or more transistors may be decreased to decrease the load placed on the one or more second voltage regulating modules 212. By changing the load placed on the one or more second voltage regulating modules 212, the first noise output produced by the one or more second voltage regulating modules 212 is changed. In some embodiments, the one or more loads 214 may include any suitable load, such as one or more of resistors, variable resistors, capacitors, inductors, transistors, a power supply feeding a bus, or the like.

Figure 5:
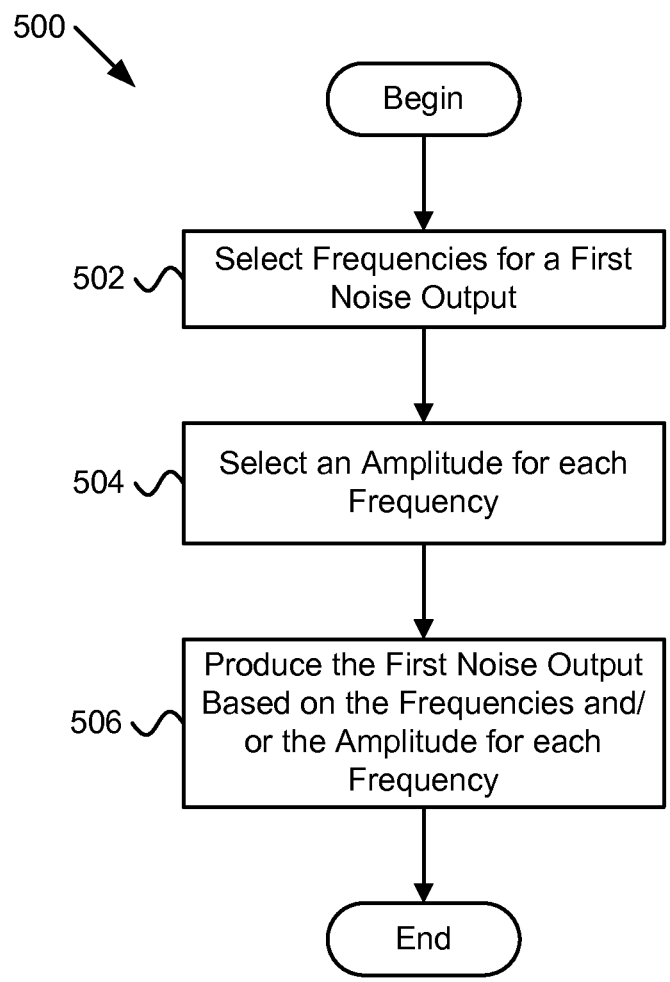
FIG. 5 is a schematic flow chart diagram illustrating one embodiment of a method for encrypting processor related noise in accordance with one embodiment of the present invention.

FIG. 5 is a schematic flow chart diagram illustrating one embodiment of a method 500 for encrypting processor related noise in accordance with one embodiment of the present invention. The method 500 begins and selects 502 frequencies for a first noise output. In certain embodiments, the frequency selection module 302 may select 502 the frequencies for the first noise output. The frequencies may be within a range of frequencies of a second noise output. The second noise output may be produced by one or more first voltage regulating modules 108 providing power to a processor 110.

The method 500 selects 504 an amplitude for each frequency of the first noise output. In some embodiments, the amplitude selection module 304 may select 504 the amplitude for each frequency of the first noise output. The method 500 produces 506 the first noise output based on one or both of the frequencies and the amplitude for each frequency and the method 500 ends. In one embodiment, the noise scrambling module 306 may produce 506 the first noise output based on one or both of the frequencies and the amplitude for each frequency. The first noise output may be combined with the second noise output to produce a third noise output such that a coherence between the third noise output and operations of the processor 110 is below a threshold. In some embodiments, the method 500 may produce a greater amount of the first noise output in response to the coherence being above the threshold than in response to the coherence being below the threshold. Furthermore, in some embodiments, the method 500 may produce the first noise output by powering one or more transistors based on one or both of the frequencies and the amplitude for each frequency.

Figure 6:
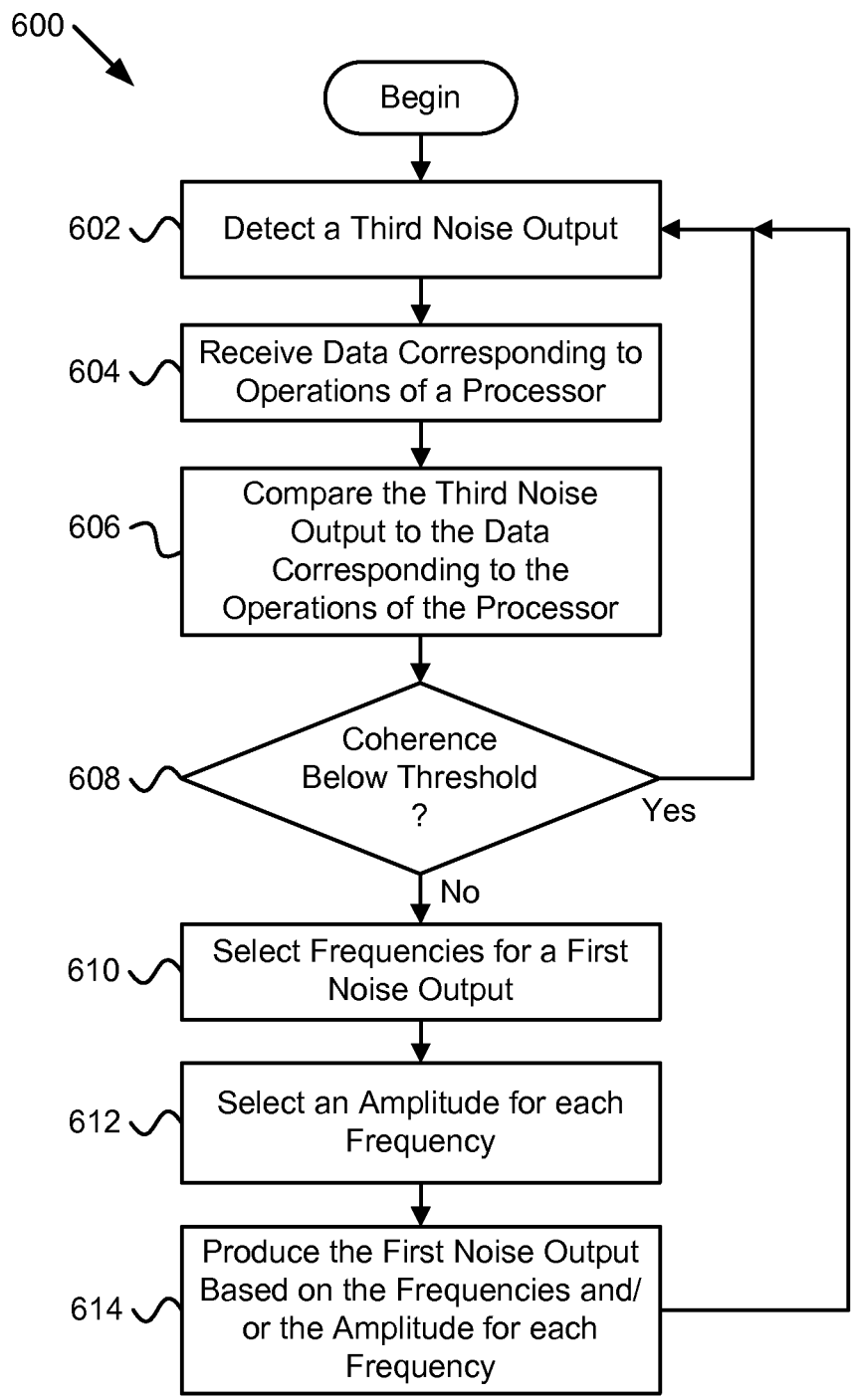
FIG. 6 is a schematic flow chart diagram illustrating another embodiment of a method for encrypting processor related noise in accordance with one embodiment of the present invention.

FIG. 6 is a schematic flow chart diagram illustrating another embodiment of a method 600 for encrypting processor related noise in accordance with one embodiment of the present invention. The method 600 detects 602 a third noise output. In some embodiments, the noise detection module 406 may detect 602 the third noise output. Moreover, the method 600 receives 604 data corresponding to operations of a processor 110. In certain embodiments, the processor monitoring module 404 may receive 604 the data corresponding to the operations of the processor 110. The method 600 compares 606 the third noise output to the operations of the processor 110 to determine the coherence. In one embodiment, the coherence determination module 402 may compare 606 the third noise output to the operations of the processor 110 to determine the coherence.

The method 600 determines 608 whether the coherence is below a threshold. In some embodiments, the noise scrambling module 306 may determine 608 whether the coherence is below the threshold, while in other embodiments, the coherence determination module 402 may determine 608 whether the coherence is below the threshold. If the method 600 determines 608 that the coherence is below a threshold, the method 600 returns to detecting 602 the third noise output. However, if the method 600 determines 608 that the coherence is not below the threshold, the method 600 selects 610 frequencies for a first noise output. In one embodiment, the frequency selection module 302 may select 610 frequencies for the first noise output. The frequencies may be within a range of frequencies of a second noise output. The second noise output may be produced by one or more first voltage regulating modules 108 providing power to the processor 110.

The method 600 selects 612 an amplitude for each frequency of the first noise output. In some embodiments, the amplitude selection module 304 may select 612 the amplitude for each frequency of the first noise output. The method 600 produces 614 the first noise output based on one or both of the frequencies and the amplitude for each frequency. In certain embodiments, the noise scrambling module 306 may produce 614 the first noise output based on one or both of the frequencies and the amplitude for each frequency. The first noise output may combine with the second noise output to produce the third noise output such that the coherence between the third noise output and the operations of the processor 110 is below the threshold. The method 600 may then return to detecting 602 the third noise output. As may be appreciated, both the frequencies and the amplitudes for the first noise output may vary to produce the first noise output. However, in certain embodiments, the amplitudes may remain constant and not be selected with each iteration, while the frequencies vary. In contrast, in other embodiments, such as the embodiment described in FIG. 7, the frequencies may remain constant and not be selected with each iteration, while the amplitudes vary.

Figure 7:
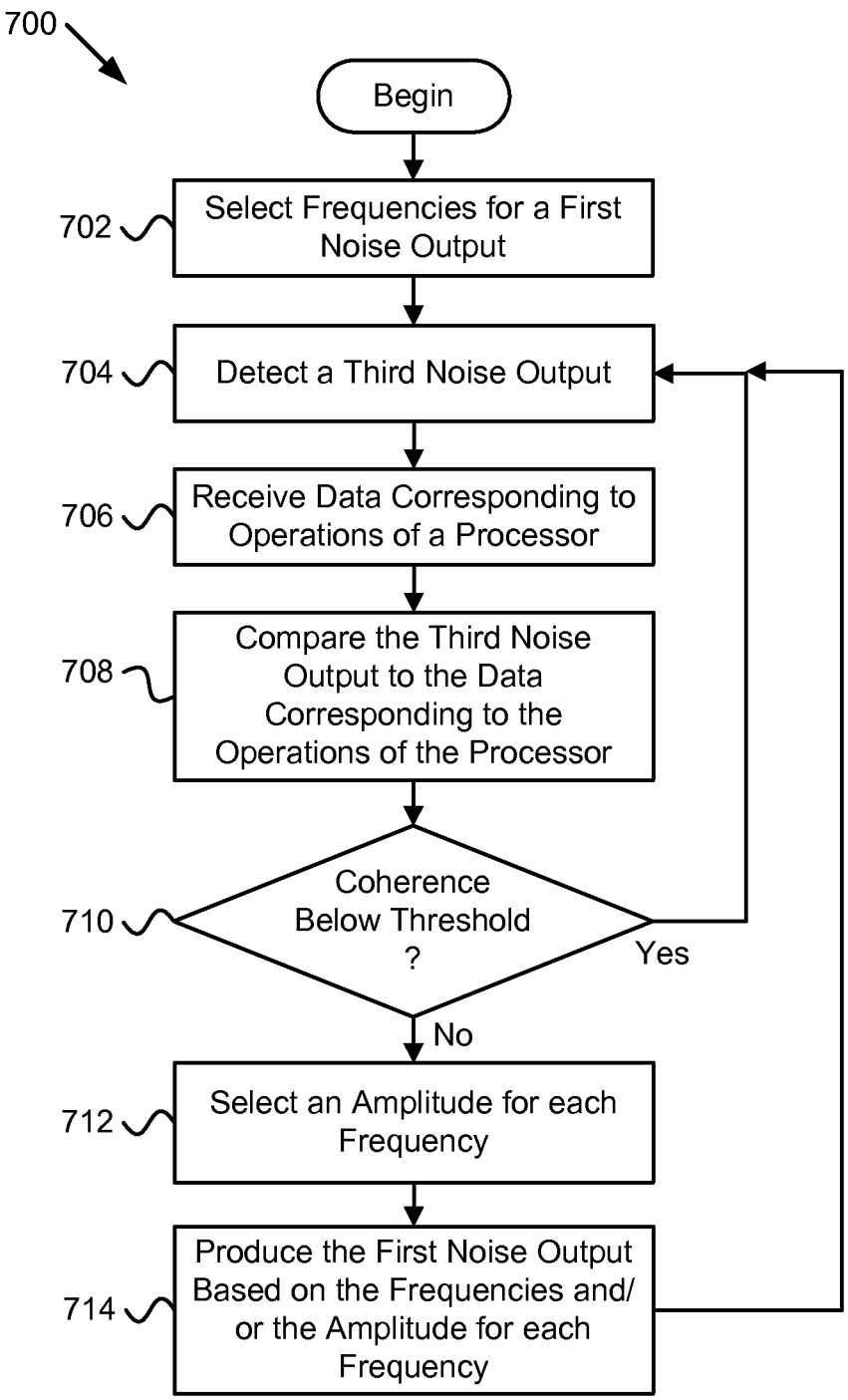
FIG. 7 is a schematic flow chart diagram illustrating a further embodiment of a method for encrypting processor related noise in accordance with one embodiment of the present invention.

FIG. 7 is a schematic flow chart diagram illustrating a further embodiment of a method 700 for encrypting processor related noise in accordance with one embodiment of the present invention. The method 700 selects 702 frequencies for a first noise output. In one embodiment, the frequency selection module 302 may select 702 frequencies for the first noise output. The frequencies may be within a range of frequencies of a second noise output so that the first noise output may be used to decrease the coherency between a third noise output and operations of a processor 110. To set the frequencies within a range of frequencies of the second noise output, the range of frequencies of the second noise output may be detected, calculated, and/or determined based on the operation or specifications of the components producing the second noise output. In some embodiments, the second noise output may be produced by one or more first voltage regulating modules 108 providing power to the processor 110. The method 700 detects 704 the third noise output. In some embodiments, the noise detection module 406 may detect 704 the third noise output. Moreover, the method 700 receives 706 data corresponding to the operations of the processor 110. In certain embodiments, the processor monitoring module 404 may receive 706 data corresponding to the operations of the processor 110. The method 700 compares 708 the third noise output to the operations of the processor 110 to determine the coherence. In one embodiment, the coherence determination module 402 may compare 708 the third noise output to the operations of the processor 110.

The method 700 determines 710 whether the coherence is below a threshold. In some embodiments, the noise scrambling module 306 may determine 710 whether the coherence is below the threshold, while in other embodiments, the coherence determination module 402 may determine 710 whether the coherence is below the threshold. If the method 700 determines 710 that the coherence is below a threshold, the method 700 returns to detecting 704 the third noise output. However, if the method 700 determines 710 that the coherence is not below threshold, the method 700 selects 712 an amplitude for each frequency of the first noise output. In certain embodiments, the amplitude selection module 304 may select 712 the amplitude for each frequency of the first noise output. In certain embodiments, the amplitude selection module 304 may select 712 the amplitude for only some frequencies of the first noise output. The method 700 produces 714 the first noise output based on one or both of the frequencies and the amplitude for each frequency. In one embodiment, the noise scrambling module 306 may produce 714 the first noise output based on one or both of the frequencies and the amplitude for each frequency. The first noise output may combine with the second noise output to produce the third noise output such that the coherence between the third noise output and the operations of the processor 110 is below the threshold. The method 700 may then return to detecting 704 the third noise output.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a frequency selection module that selects a plurality of frequencies for a first noise output, the plurality of frequencies within a range of frequencies of a second noise output, the second noise output produced by one or more first voltage regulating modules providing power to a processor;
an amplitude selection module that selects an amplitude for each frequency of the plurality of frequencies of the first noise output;
a noise scrambling module that produces the first noise output based on one or both of the frequency selection module and the amplitude selection module, wherein the first noise output combines with the second noise output to produce a third noise output such that a coherence between the third noise output and operations of the processor is below a threshold; and a noise detection module comprising a transducer, wherein the transducer detects the third noise output;

wherein said modules comprise one or more of a hardware circuit, a programmable logic device, and code stored on one or more computer readable storage devices, wherein when the code is stored on one or more computer readable storage devices, further comprising a processor for execution of the code.

2. The apparatus of claim 1, further comprising a coherence determination module that compares the third noise output to the operations of the processor to determine the coherence.

3. The apparatus of claim 2, further comprising a processor monitoring module that monitors the operations of the processor and provides data corresponding to the operations of the processor to the coherence determination module.

4. The apparatus of claim 2, wherein the noise detection module provides the third noise output to the coherence determination module.

5. The apparatus of claim 1, wherein the frequency selection module selects the plurality of frequencies for the first noise output based at least partly on the coherence, and the amplitude selection module selects the amplitude for each frequency of the plurality of frequencies of the first noise output based at least partly on the coherence.

6. The apparatus of claim 1, wherein the noise scrambling module further comprises one or more second voltage regulating modules and one or more loads coupled to the one or more second voltage regulating modules, wherein the one or more second voltage regulating modules produce the first noise output.

7. The apparatus of claim 6, wherein the one or more loads are varied to change the first noise output.

8. The apparatus of claim 7, wherein the one or more loads are varied by one or both of:
the frequency selection module selecting the plurality of frequencies for the first noise output; and
the amplitude selection module selecting the amplitude for each frequency of the plurality of frequencies of the first noise output.

9. The apparatus of claim 8, wherein the one or more loads are varied based on the coherence between the third noise output and the operations of the processor.

10. The apparatus of claim 7, wherein the one or more loads are varied to produce a greater amount of the first noise output in response to the coherence being above the threshold than in response to the coherence being below the threshold.

11. The apparatus of claim 7, wherein the one or more loads are varied to increase the first noise output in response to the coherence being above the threshold.

12. The apparatus of claim 6, wherein the one or more loads further comprise one or more transistors.

13. A method comprising:
selecting a plurality of frequencies for a first noise output, the plurality of frequencies within a range of frequencies of a second noise output, the second noise output produced by one or more first voltage regulating modules providing power to a processor;
selecting an amplitude for each frequency of the plurality of frequencies of the first noise output;
producing the first noise output based on one or both of the plurality of frequencies and the amplitude for each frequency, wherein the first noise output combines with the second noise output to produce a third noise output such that a coherence between the third noise output and operations of the processor is below a threshold; and
detecting the third noise output using a transducer.

14. The method of claim 13, further comprising comparing the third noise output to the operations of the processor to determine the coherence.

15. The method of claim 13, further comprising producing a greater amount of the first noise output in response to the coherence being above the threshold than in response to the coherence being below the threshold.

16. The method of claim 13, wherein producing the first noise output based on one or both of the plurality of frequencies and the amplitude for each frequency further comprises powering one or more transistors based on one or both of the plurality of frequencies and the amplitude for each frequency.

17. A system comprising:
a processor;
one or more first voltage regulating modules that provide power to the processor;
one or more second voltage regulating modules that provide scrambling noise;
a frequency selection module that selects a plurality of frequencies for a first noise output, the plurality of frequencies within a range of frequencies of a second noise output, the second noise output produced by the one or more first voltage regulating modules;
an amplitude selection module that selects an amplitude for each frequency of the plurality of frequencies of the first noise output;
a noise scrambling module that produces the first noise output based on one or both of the frequency selection module and the amplitude selection module, wherein the first noise output combines with the second noise output to produce a third noise output such that a coherence between the third noise output and operations of the processor is below a threshold; and
a noise detection module comprising a transducer, wherein the transducer detects the third noise output;
wherein said modules comprise one or more of a hardware circuit, a programmable logic device, and code stored on one or more computer readable storage devices, wherein when the code is stored on one or more computer readable storage devices, the code is executable by the processor.

18. The system of claim 17, further comprising a printed circuit board (PCB) comprising the processor, the one or more first voltage regulating modules, the one or more second voltage regulating modules, the frequency selection module, the amplitude selection module, and the noise scrambling module.

19. The system of claim 17, further comprising an information handling device that includes the processor, the one or more first voltage regulating modules, the one or more second voltage regulating modules, the frequency selection module, the amplitude selection module, and the noise scrambling module.

* * * * *